US011967765B1

(12) United States Patent
Lee et al.

(10) Patent No.: US 11,967,765 B1
(45) Date of Patent: Apr. 23, 2024

(54) LOW SIDE LOBE LEVEL INTEGRATED CAVITY BACKED SLOT ARRAY ANTENNA SYSTEM

(71) Applicant: GM GLOBAL TECHNOLOGY OPERATIONS LLC, Detroit, MI (US)

(72) Inventors: Hanseung Lee, Thousand Oaks, CA (US); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 939 days.

(21) Appl. No.: 16/940,500

(22) Filed: Jul. 28, 2020

(51) Int. Cl.
*H01Q 21/00* (2006.01)
*H01Q 13/18* (2006.01)

(52) U.S. Cl.
CPC .......... *H01Q 21/005* (2013.01); *H01Q 13/18* (2013.01)

(58) Field of Classification Search
CPC .......................... H01Q 21/005; H01Q 13/18
See application file for complete search history.

(56) References Cited

U.S. PATENT DOCUMENTS 6,933,881 B2 8/2005 Shinoda et al.
7,880,614 B2 2/2011 Forster et al.
8,704,719 B2 4/2014 Song et al.
2002/0101385 A1* 8/2002 Huor .................. H01Q 21/005 343/770
2010/0085263 A1* 4/2010 Yano .................... H01Q 13/22 343/771
2012/0007771 A1* 1/2012 Miyagawa .......... H01Q 21/005 342/175
2014/0019813 A1 1/2014 McLean et al.
2015/0002329 A1 1/2015 Murad et al.

OTHER PUBLICATIONS

Johnson J. H. Wang, "Traveling-wave antenna array (TWAA) with multioctave scan-gain-bandwidth", Phased Array Systems and Technology (PAST) 2016 IEEE International Symposium on, pp. 1-8, 2016.
M. Grabowski, "Non-resonant slotted waveguide antenna design method", High Frequency Electronics, Feb. 2012.
S. M. Bowers, A. Safaripour, A. Hajimiri, "An integrated traveling-wave slot radiator", IEEE Radio Freq. Integr. Circuits Symp. Dig., pp. 369-372, Jun. 2014.
Rajput, Y.; Rawat, T.S.; Varshney, L.: CPW fed patch antenna for GPS applications. Int. J. Comput. Eng. Res., 2 (6) (2012), 5-8.
Z. Chen and S.Otto, "A Taper Optimization for Pattern Synthesis of Microstrip Series-Fed Patch Array Antennas," Proceedings of the 2 European Wireless Technology Conference, 2009.

(Continued)

*Primary Examiner* — Tina M Wong
(74) *Attorney, Agent, or Firm* — Lorenz & Kopf, LLP

(57) ABSTRACT

An antenna system operates in a hybrid coplanar waveguide and rectangular waveguide mode. A slot array with a conductive layer is disposed on a substrate and defines a coplanar waveguide joining a number of side slots arranged in a line forming the slot array. Another substrate is spaced apart from the substrate and a ground plane is defined thereon. A defined volume waveguide is disposed between the substrates. The array is configured to radiate a radiation pattern in a hybrid mode that results from a combination of the slot array and the defined volume waveguide. The side slots may be elliptical in shape for side lobe level reduction.

20 Claims, 5 Drawing Sheets

(56) References Cited

OTHER PUBLICATIONS

Shaowen Hu, Yiqiang Wu, Ye Zhang, Huilin Zhou, "Design of a CPW-Fed Ultra Wide Band Antenna", Open Journal of Antennas and Propagation, vol. 1, pp. 18-22, 2013.

R. Paryani, "Design of a wideband dual-polarized cavity backed slot antenna," University of Central Florida, Tech. Rep., 2010.

J. F. Huang, C. W. Kuo, "CPW-fed bowtie slot antenna", Microw. Opt. Technol. Lett., vol. 19, No. 5, pp. 358-360, Dec. 1998.

W. Li, K. D. Xu, X. Tang, Y. Yang, Y. Liu, Q. H. Liu, " Substrate integrated waveguide cavity-backed slot array antenna using high-order radiation modes for dual-band applications in K-band ", IEEE Trans. Antennas Propag., vol. 65, No. 9, pp. 4556-4565, Sep. 2017.

Holland, S.S.: Minituarization of microstrip patch antennas for GPS application, May 2008.

Chethan Kumar Y.B Abdulraheem Killedar. "mmWave Radar—ADAS Application: Embedded Processing—Radar, Analytics & Processors", 2016.

I. Nystrom, D. Karlsson, "Reduction of back radiation and cross-coupling in dual polarized aperture coupled patch antennas", 1997 IEEE Antennas Propagat. Soc. Int. Symp. Dig., pp. 2222-2225.

http://www.statschippac.com/~/media/Files/DocLibrary/brochures/STATS_ChipPAC_SiP.ashx. "System-in-Packge (SiP) Solutions". JCET. STATS_ChipPAC_Pte.Ltd. 2018.

James W. McKnight; "A cavity-backed coplanar waveguide slot antenna array", University of South Florida Scholar Commons, 2009.

* cited by examiner

LOW SIDE LOBE LEVEL INTEGRATED CAVITY BACKED SLOT ARRAY ANTENNA SYSTEM

INTRODUCTION

The technical field generally relates to antennas, and more particularly relates to cavity backed slot array antenna systems that deliver reduced side lobe loss and improved bandwidth in sub-terahertz applications such as radar imaging.

In general, range, velocity, azimuth angle and other target attributions are measured by radar devices. In some applications, such as radar systems for vehicles, it may be desirable to provide information representing or relating to the characteristics of a target or object detected by the radar system. This information may be used to evaluate the detected target or object. In applications such as object detection and classification, fast and precise capabilities are desirable for immediate determinations regarding approaching objects. The azimuth and the elevation of an object are typical parameters of interest. Receiving accurate object information for processing requires an antenna that supports the determination requirements, including by reliably operating over a sufficiently wide frequency bandwidth.

An antenna radiates energy in a pattern and any radiation lobe of the pattern that extends in a direction other than the intended direction of coverage is referred to as a side lobe. Side lobe level (SLL) refers to the relation between a side lobe and the radiation pattern's main lobe. A large SLL may result in receiving less than optimal information about a target or may interfere with accurate target identification. Accordingly, a low SLL is desirable because it means that a minimum of power is radiated in an unwanted direction and a maximum power is radiated in the intended direction of coverage.

Waveguide slot antennas are antennas used in high frequency and high power applications. Waveguide slot antennas are typically fed by an enclosed waveguide that is used as the wave transmission carrier to feed the slots. However, the enclosed waveguide with radiation and ground elements at different levels requires a substantial volume of space to transmit the waves to the slots. In addition, slot antennas may be complicated to manufacture and have relatively high fabrication and assembly costs. Printed antennas with coplanar waveguides possesses advantages such as low profile, light weight, small volume and use thin coplanar feed and ground elements requiring less space. However, one of the restrictions of antennas fed by a coplanar waveguide that limits their application is that their radiation is not sufficiently directional. In addition, managing SLL in arrayed printed antennas is challenging.

Electromagnetic wave propagation through a waveguide is characterized by a number of wave formats. One format is transverse electric (TE) mode, which is a waveguide mode that is dependent on transverse waves where the electric vector of the waves is perpendicular to the direction of propagation. Another format is transverse magnetic (TM) mode where the magnetic vector of the waves is perpendicular to the direction of wave propagation. A third format is transverse electromagnetic (TEM) mode, where both the electric vector and the magnetic vector of the waves are perpendicular to the direction of propagation. Another format, a quasi-TEM mode, is characterized by waves that have propagation-axis directed components of the electric and magnetic vectors. A given waveguide typically has only one dominant mode. Accordingly, the enclosed waveguide or the coplanar waveguide will have only one of the TE, TM or TEM modes as its dominant mode.

Accordingly, it is desirable to provide antenna systems that provide desirable performance characteristics such as improved SLL, greater bandwidth and broader operating modes. Furthermore, other desirable features and characteristics of the present invention will become apparent from the subsequent detailed description and the appended claims, taken in conjunction with the accompanying drawings and the foregoing technical field and background.

SUMMARY

An antenna system operates in a hybrid coplanar waveguide and rectangular waveguide mode. In a number of embodiments, a slot array with a conductive layer is disposed on a substrate and defines a coplanar waveguide joining a number of side slots arranged in a line forming the slot array. Another substrate is spaced apart from the substrate and a ground plane is defined thereon. A defined volume waveguide is disposed between the substrates. The system is configured to radiate a radiation pattern in a hybrid mode that is a combination of the slot array and the defined volume waveguide. The side slots may be elliptical in shape for improved side lobe level reduction.

In additional embodiments, a number of conducting pillars ground the conductive layer to the ground plane and, along with the conductive layer and the ground plane, define the defined volume waveguide.

In additional embodiments, the defined volume waveguide is rectangular in shape.

In additional embodiments, each of the number of side slots is elliptical in shape.

In additional embodiments, the elliptical shape of the side slots is elongated in a direction perpendicular to the coplanar waveguide.

In additional embodiments, signal coupling is provided between the coplanar waveguide and the defined volume waveguide.

In additional embodiments, the coplanar waveguide is configured for a quasi-TEM mode and the defined volume waveguide is configured for a TE mode. The radiation pattern results from the hybrid mode as a combination of the quasi-TEM mode and the TE mode.

In additional embodiments, a transceiver module is disposed between the substrates and is coupled with the coplanar waveguide and with the defined volume waveguide.

In additional embodiments, one of the substrates is a radio frequency printed circuit board, and the ground plane is disposed on the radio frequency printed circuit board.

In additional embodiments, a radar processing module is disposed on the radio frequency printed circuit board and is coupled with the coplanar waveguide and with the defined volume waveguide through the transceiver module.

In a number of additional embodiments, an antenna system includes a slot array defined by a conductive layer disposed on a substrate. The conductive layer defines a coplanar waveguide joining a number of side slots arranged in a line forming the slot array. The side slots are spaced from one another and each is formed in an elliptical shape. A ground plane is defined on another substrate that is spaced away from the substrate on which the slot array is disposed. A defined volume waveguide is disposed between the two substrates. The system is configured to radiate a radiation pattern in a hybrid mode that results from a combination of the slot array and the defined volume waveguide.

In additional embodiments, a number of conducting pillars ground the conductive layer to the ground plane and, along with the conductive layer and the ground plane, define the defined volume waveguide.

In additional embodiments, the elliptical shape of the side slots is elongated in a direction perpendicular to the coplanar waveguide.

In additional embodiments, a transition is provided between each side slot and the coplanar waveguide. The transition is disposed adjacent an end of the elliptical shape.

In additional embodiments, signal coupling is provided between the coplanar waveguide and the defined volume waveguide.

In additional embodiments, the coplanar waveguide is configured for a quasi-TEM mode and the defined volume waveguide is configured for a TE mode. The radiation pattern results from the hybrid mode as a combination of the quasi-TEM mode and the TE mode.

In additional embodiments, a transceiver module is disposed between the substrates and is coupled with the coplanar waveguide and with the defined volume waveguide.

In additional embodiments, one of the substrates is a radio frequency printed circuit board, and the ground plane is disposed on the radio frequency printed circuit board.

In additional embodiments, a radar processing module is disposed on the radio frequency printed circuit board. The radar processing module is coupled with the coplanar waveguide and with the defined volume waveguide, through the transceiver module.

In a number of other embodiments, an antenna system includes a substrate made of a dielectric material. A conductive layer on the substrate defines a feed slot joining a number of side slots arranged in a line forming an antenna array in the conductive layer. The side slots are spaced from one another and the array is disposed on the first substrate. The side slots are elliptical in shape. A coplanar waveguide is configured to launch a signal to the antenna array. A radio frequency printed circuit board substrate is disposed spaced away from the dielectric substrate. A ground plane is disposed on the radio frequency printed circuit board substrate. A number of conducting pillars ground the conductive layer to the ground plane. The conductive layer, the ground plane, and the conductive pillars delimit a defined volume waveguide. The system is configured to generate a radiation pattern of electromagnetic energy from the antenna array and the defined volume waveguide. The coplanar waveguide is configured for a quasi-TEM mode and the defined volume waveguide is configured for a TE mode and the radiation pattern results in a hybrid mode as a combination of the quasi-TEM mode and the TE mode.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit, an electronic circuit, a processor (shared, dedicated, or group) and memory that executes one or more software or firmware programs, a combinational logic circuit, and/or other suitable components that provide the described functionality.

This description discloses configurations and implementations of antenna systems for operating at very high frequencies, such as 228-240 GHz, a sub-terahertz frequency range for uses such as radar imaging. Embodiments of antenna architectures and components disclosed herein in general, may use a thin interposer substrate of a dielectric material such as silicon that supports a hybrid antenna configuration in a small package. In a number of embodiments, an antenna system effectively radiates electromagnetic energy for a radiation pattern with beneficial coverage and low SLL. The antenna radiating structure generally includes a slotted layer array and a defined volume waveguide. The defined volume waveguide may be rectangular in shape and may be defined by the slotted layer, a number of conducting pillars and a ground plane. The ground plane may be located on a radio frequency printed circuit board (RF-PCB) that may contain additional integrated circuits and electronic components. A feed line connects a transceiver (Tx, Rx chip) directly to the antenna to transmit and receive inputs/outputs from radio frequency integrated circuits. A coplanar waveguide to slotted array transition is used to excite the array and signal coupling is provided between the coplanar waveguide and the rectangular waveguide for dual excitation. The design of a hybrid radiating system advantageously produces a high power radiating signal. The elongated nature of the system produces a relatively narrow beam width in elevation and a relatively broad beam width in azimuth. In a number of embodiments, multiple antennas, such as three or four, may be arrayed on the azimuth direction for providing a narrow beam and beam scanning capability. Providing multiple antennas, each with a narrow beam, provides finer scanning resolution. In other applications, the antenna may be tailored to different beam widths corresponding to the scope of view of interest. In a number of embodiments, the antenna system provides low SLL over a 12 GHz bandwidth and desirable radiation patterns in a compact, low cost architecture.

Figure 1:
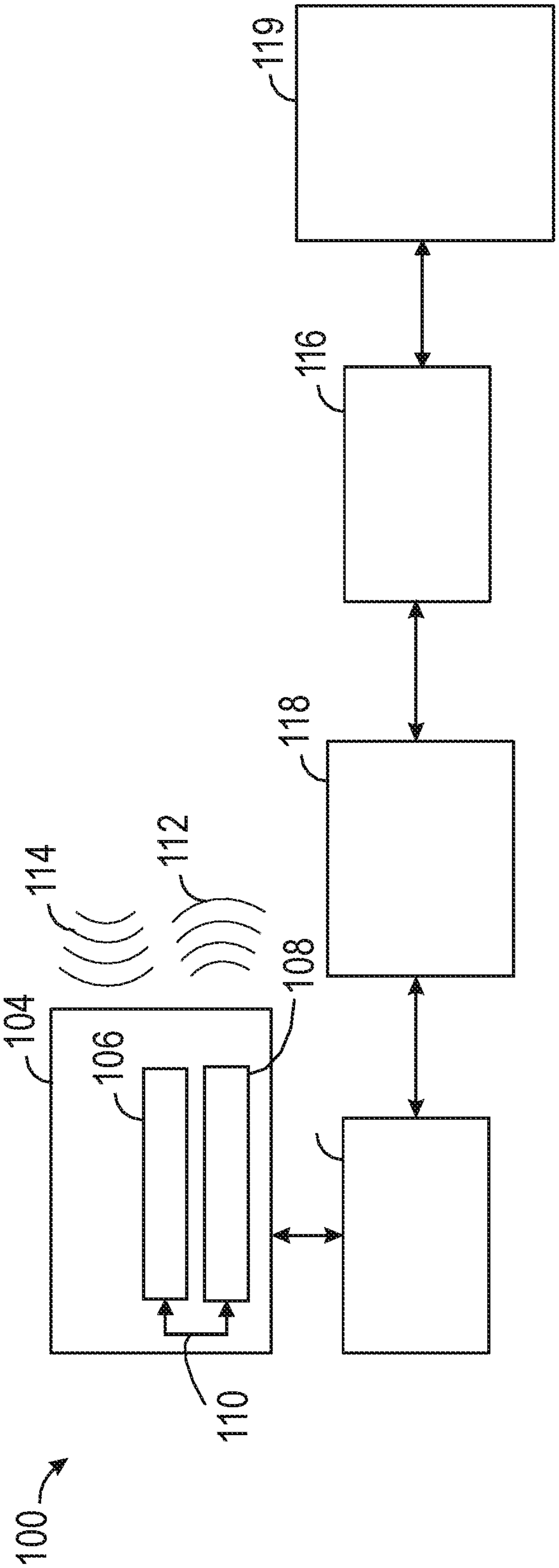
FIG. 1 is a functional block diagram of an antenna system, in accordance with an embodiment.

Referring to FIG. 1, a functional block diagram of an antenna system 100 for radar applications includes a transceiver module 102 providing both transmitting (Tx) and receiving (Rx) functions. The transceiver module 102 is coupled with a cavity-backed slot array (CB SA) antenna module 104 that includes a transmitting/receiving antenna structure with a coplanar waveguide 106 and a defined volume waveguide 108 in the form of a rectangular waveguide. Signal coupling 110 is provided between the coplanar waveguide 106 and the waveguide 108 and there is radiation in a hybrid mode configuration. The antenna module 104 is configured to radiate 112 and receive 114 electromagnetic energy according to characteristics further described below. In transmission, the antenna module 104 receives a signal from the transceiver module 102 and radiates 112 a radio frequency signal. In reception 114 the antenna module 104 detects any reflections from potential targets and delivers a signal to the transceiver module 102. In the current embodiment, the transceiver module 102 is coupled directly with the antenna module 104.

A radar processing module 116 interfaces with the transceiver module 102 through a physical signal coupling 118 as further described below. In some embodiments, the processor and transceiver functions may be on the same chip. In the current embodiment, the processing module 116 includes a processor that sends control signals to the transceiver module 102, processes the received signals to identify targets and their attributes, and may serve as an interface with other controllers such as electronic control unit(s) of a vehicle through a vehicle interface physical layer 119. For example, the processing module 116 may receive data on reflections, compare them to the transmitted signal and determine range, angle and velocity of a target. In the current embodiment, the transceiver module 102 is a self-contained frequency modulated continuous wave transceiver single-chip solution for the desired GHz band. Other embodiments may employ separate transmitter and receiver devices. In the current embodiment, the transceiver module 102 contains the circuitry including power amplifiers, low noise amplifiers, phase shifters, switches, filters, DC biasing, etc. for operating and interfacing with the antenna module 104. The transceiver module 102 may convey communication data to and from the radar processing module 116, from which data is in-turn conveyed to and from the antenna module 104. In the current embodiment the transceiver module 102 is contained on a single chip and may be embodied as a monolithic microwave integrated circuit (MMIC) chip.

Figure 2:
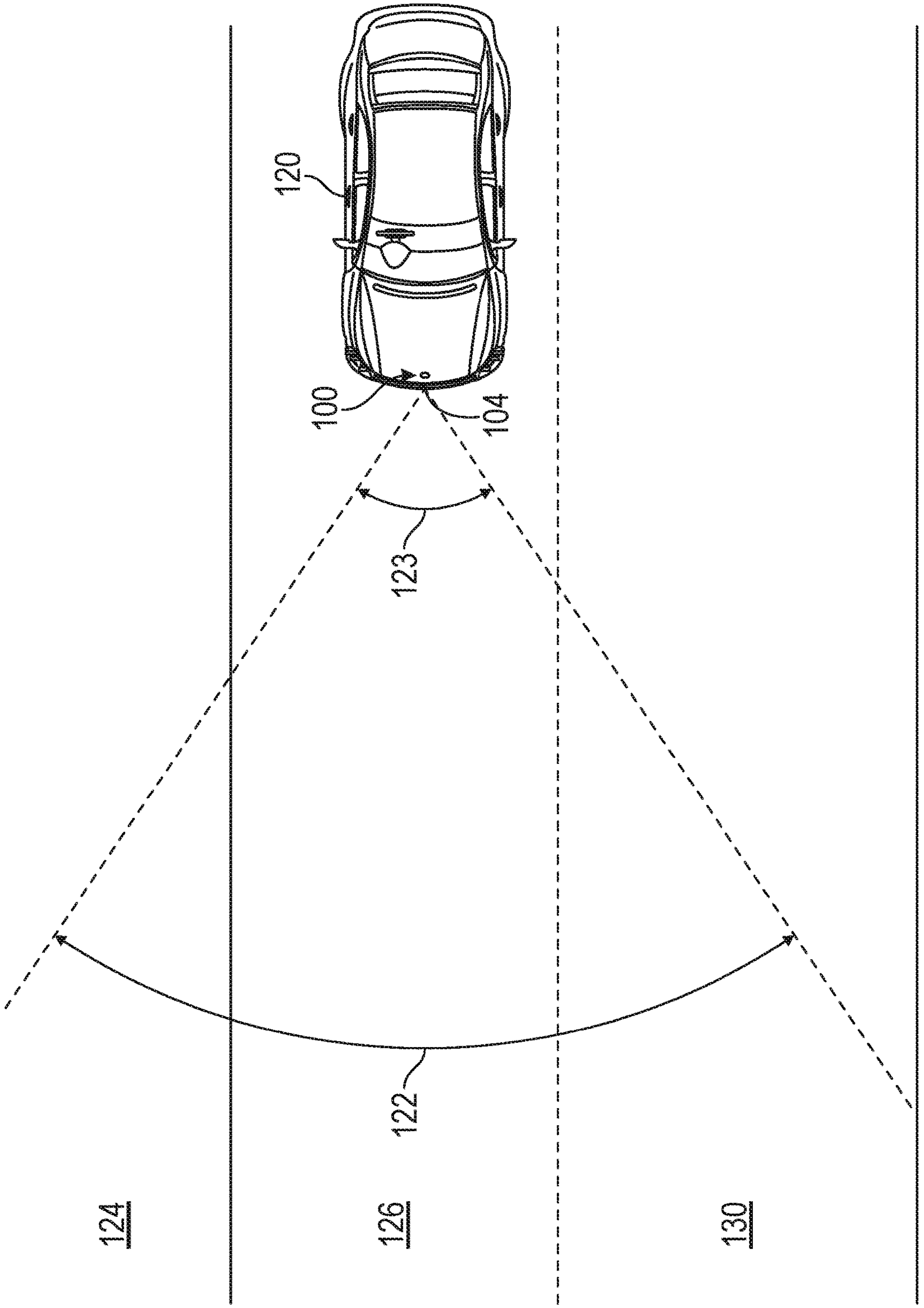
FIG. 2 is a schematic illustration of the azimuth coverage of an antenna system in a vehicle, in accordance with an embodiment.
Figure 3:
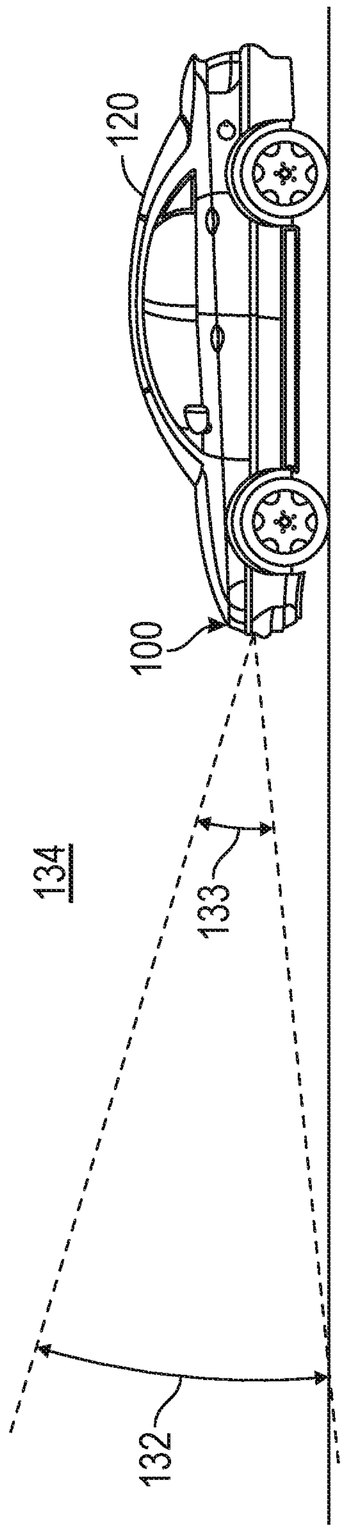
FIG. 3 is schematic illustration of the elevation coverage of an antenna system in a vehicle, in accordance with an embodiment.

Referring to FIGS. 2 and 3, the antenna system 100 may be applied to a vehicle 120 to cover a particular area, in this example to cover the area in front of a vehicle 120. It should be understood that additional antennas and/or antenna systems may be included, such as to provide radars with different ranges such as long range and mid-range. Additional radars may be used to detect targets in multiple directions such as at the sides of the vehicle 120 and/or at the rear of the vehicle 120. The radar physical radiation may be three-dimensional but for purposes of the present disclosure is represented by both horizontal (azimuth) and vertical (elevation) radiation patterns.

The radiation pattern of the antenna system 100 depends on the structure of the antenna module 104 as further described below and its mounting, in this example on the vehicle 120. FIG. 2 depicts the beam width 122 of the radar in the azimuth plane 124, assuming the radar is at the front bumper of the vehicle 120. In some embodiments, multiple antennas, such as three or four, may be arrayed and the beam width may be tailored to cover a road lane 126 and as such would have a field of view with an angle 123 of approximately ±15-degrees, or 30-degrees total while avoiding detection of vehicles in the adjacent lane 130. In other embodiments, the field of view is selected for the application. FIG. 3 depicts the beam width 132 of the radar in the vertical plane 134. In the vertical plane 134 the coverage may be narrower, for example ±5-degrees or 10-degrees total.

Figure 4:
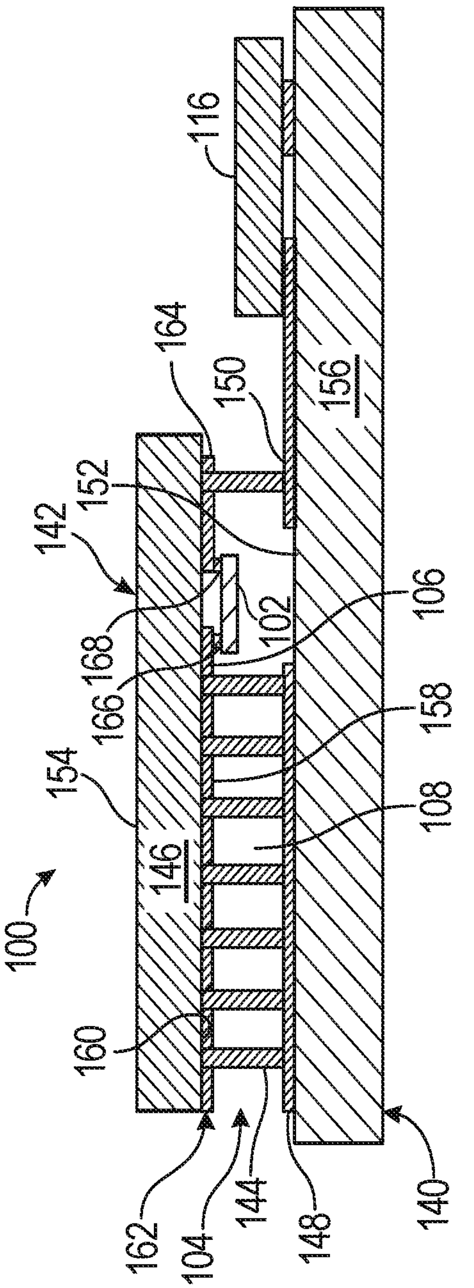
FIG. 4 is a schematic, detail illustration of part of the antenna system of FIG. 1, in accordance with an embodiment

Referring to FIG. 4, the architecture of the antenna system 100 is shown schematically in cross section. The antenna system 100 includes an integrated assembly that connects radar integrated circuits including the radar processing module 116, which is located on a radio frequency printed circuit board (RF-PCB) 140. An interposer assembly 142 is mounted on the RF-PCB 140 by means of conducting pillars, which in this embodiment are copper pillars 144. The copper pillars extend from the interposer substrate 146 to conductors on the RF-PCB 140. In this embodiment the conductors comprise a ground plane 148 and a conductive patch 150, and the interposer substrate 146 comprises a dielectric, specifically silicon. The RF-PCB 140 has a metal layer printed or otherwise deposited or applied to its surface 152 of substrate 156 and which serves as conductors including the ground plane 148 and the conductive patch 150, which provides a connection between the radar processing module 116 and the transceiver module 102/antenna module 104. The copper pillars 144 support and ground the interposer substrate 146 at a position that is spaced away from the ground plane 148 of the RF-PCB 140. The surface 154 of the interposer substrate 146 is clear of any additional layers above the silicon and in this embodiment is free from electronic elements that would otherwise require coupling through the interposer substrate 146, thereby limiting complexity. An array antenna layer 158 is defined by a conductive material and is disposed on the surface 160 of the interposer substrate 146 that faces the ground plane 148. The array antenna layer 158 contains the coplanar waveguide 106. Any need is avoided for structures through the interposer substrate 146 that would otherwise be used to couple with electronic components at the surface 154, since it remains clear.

On the surface 160 of interposer substrate 146 that faces the ground plane 148, a redistribution layer 162 comprises a conductive material 164 made of a substance such as metal and in this embodiment copper, that is printed or otherwise applied on the surface 160. The redistribution layer 162 provides a transition from the transceiver module 102 to the conductive feed for CB SA antenna module 104.

The transceiver module 102 is connected with the redistribution layer 162 and specifically from the redistribution layer 162 by transitions 166,168. A low loss feed launch from the transceiver module 102 to the antenna module 104 is provided through the transitions 166, 168 for efficient excitation. The architecture of the antenna system 100 shows that the feed connects through the transceiver module 102, which is efficiently located between the substrate 156 of the RF-PCB 140 and the interposer substrate 146. The antenna feed may be located on the same surface 160 of the interposer substrate 146 as are both the transceiver module 102 and the array antenna layer 158. As a result, the illustrated embodiment is advantageous from a cost and fabrication complexity perspective.

An air cavity in the form of the waveguide 108 is formed between the interposer substrate 146 and the RF-PCB substrate 156. Specifically, the waveguide 108 has a volume that is defined and bounded by the array antenna layer 158, the ground plane 148 and the copper pillars 144. As such, the waveguide 108 is rectangular in shape. In other embodiments, another shape for the waveguide 108 may be used.

The processing module 116 communicates through RF-PCB 140, the interposer assembly 142 including an interposer substrate 146 and the transceiver module 102, with suitable transmission line connections. The antenna system 100 enables transmit signals from the processing module 116 through the transceiver module 102 to connect with the antenna module 104. In reception, the antenna module 104 collects incoming signals, which are sent to the processing module 116 by the transceiver module 102. This structure delivers a compact package and desirable RF performance at the applicable operating frequencies when coupled with antennas having a geometry described below. It should be understood that the operating frequencies of the antenna system may be over a bandwidth such as 12 GHz, such as 228-240 GHz.

Figure 5:
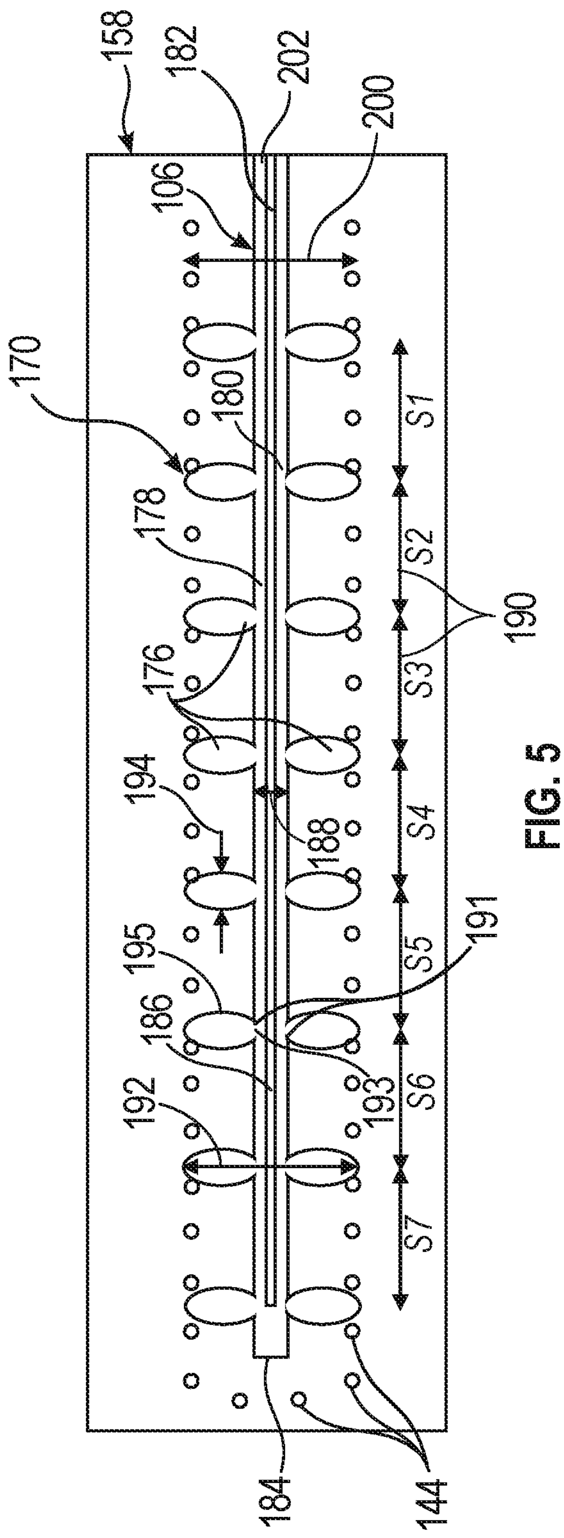
FIG. 5 is a schematic, plan view illustration of part of the antenna system of FIG. 1, in accordance with an embodiment.
Figure 6:
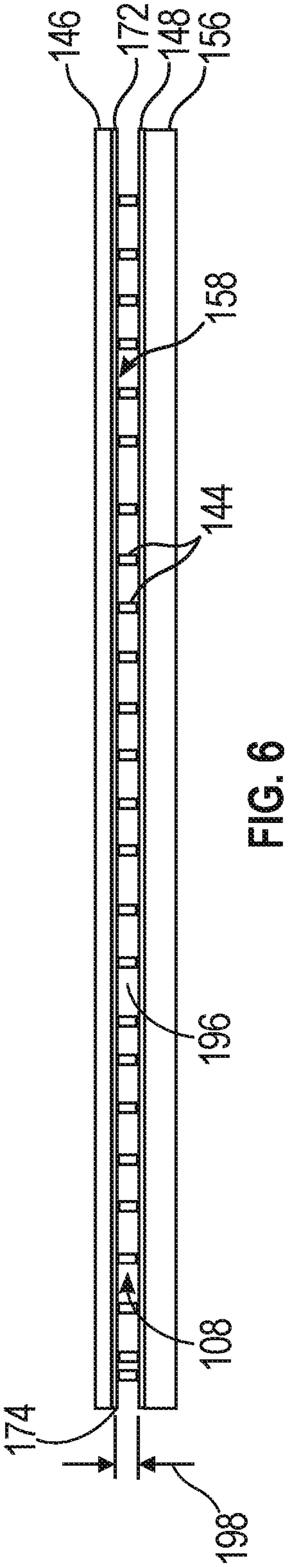
FIG. 6 is a schematic side view illustration of the antenna system of FIG. 5, in accordance with an embodiment.

Components of the antenna system 100 are illustrated in greater detail in FIGS. 5 and 6, in particular showing details of the array antenna layer 158 and the waveguide 108. The antenna array 170 is a slot type array and is defined in the array antenna layer 158. The antenna array 170 includes a conductive layer 172, in this embodiment of a copper material, disposed on the entire or substantially the entire, surface of the substrate 174. The conductive layer may be coextensive with the redistribution layer of FIG. 4. The antenna array 170 is configured for broad bandwidth and low losses as a travelling wave array. The antenna array 170 includes a number of side slots 176 fed by the coplanar waveguide 106. Two feed slots 178, 180 of the coplanar waveguide 106 are formed completely through the thickness of the conductive layer 172 and extend for a length from feed end 182 to an opposite end 184 and join together at the end 184. The feed slots 178, 180 are parallel with one another and are defined on opposite side of conductive signal line 186 and are defined on a gap 188 of 120 μm.

The feed slots 178, 180 join with the several side slots 176, which are arranged in pairs along the antenna array 170, in this case totaling eight pairs for sixteen slots. In other embodiments a different number of side slots 176 may be used to achieve the desired coverage and resolution. For example, adding additional side slot pairs along the length of the antenna array 170 may increase resolution. The radiating elements of the antenna array 170 are the side slots 176, which are each coupled directly to one of the feed slots 178, 180 to receive the propagating waves. The side slots 176 radiate individually and due to their arrayed configuration, the radiation of all the elements sum to form the antenna array's radiation beam, which has high gain and high directivity, with minimum losses. Antenna performance is a function of the structure of the antenna array 170. In the current embodiment, the side slots 176 are elliptical in shape with their long dimension extending laterally at ninety-degrees relative to the feed slots 178, 180, which has been found to be beneficial in SLL reduction. The transitions 191 between the side slots 176 and the feed slots 178, 180 are defined adjacent the narrow end 193 of the elliptical shape, as opposed to the elongated side 195 of the elliptical shape for efficient signal feed. The side slots 176 have even spacings 190 of 555 μm, lengths 192 across each aligned pair of side slots 176 of 641 μm, and widths 194 of 140 μm for optimum performance at 228-240 GHz.

The copper pillars 144 extend from the conductive layer 172 to the ground plane 148 as shown in FIG. 6. The cavity 196 of the waveguide 108 is disposed between the conductive layer 172 and the ground plane 148, and is bounded by the copper pillars 144. The copper pillars 144 surround the antenna array 170 and have a height to define the height 198 of the waveguide 108 at 75 μm. The copper pillars 144 are positioned at a width 200 of 641 μm which coincides with the slot length 192 to reduce wave leakage. The coplanar waveguide 106 and waveguide 108 are coupled with the transceiver module through a ground-signal-ground feed of coplanar waveguide transition 202.

Figure 7:
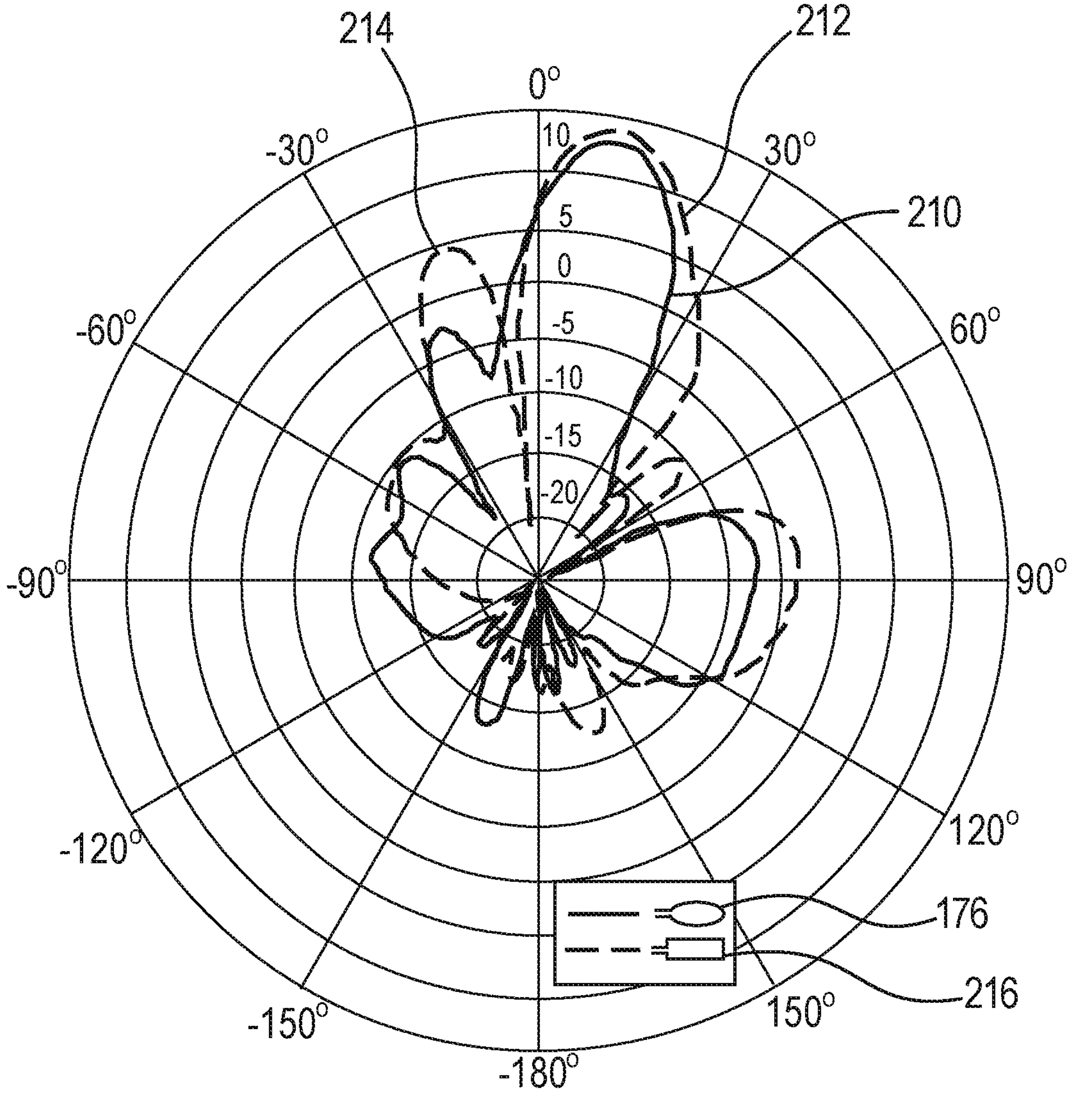
FIG. 7 is a far field comparison plot of the antenna system of FIG. 4 and an antenna system with non-elliptical slots.

The combination of the elliptical side slots 176, the coplanar waveguide 106 and the waveguide 108 provides an effective, low SLL, strong radiation pattern, sub-terahertz CBSA antenna. The elliptical shape of the side slots 176 supports beneficial radiation patterns, which when coupled with radiation from the signal coupled waveguide 108 produces an electric field radiation pattern at the array antenna layer 158 that extends laterally substantially across the 641 μm distance of the side slot length 192 and the pillar width 200. By using elliptical shape side slots 176, the hybrid transmission mode is enhanced and SLL is significantly improved compared with non-elliptical slots. The coplanar waveguide transition 202 is used for connecting with the transceiver module 102 and is the major transmission line for signal flow. The waveguide 108 prevents backside radiation and its transmission mode combined with the coplanar waveguide mode form a hybrid mode that also improves SLL. At 240 GHz, the CBSA antenna module has been found to improve overall SLL by 33%. An example reduction is illustrated in FIG. 7 where effective coverage of approximately thirty-degrees is shown by the plot 210 with reduced SLL as compared to the plot 212. The solid line of the plot 210 is for the antenna system 100 with elliptical side slots 176 and the dashed line of the plot 212 is for an antenna system without elliptical side slots (cornered side slot 216), and without signal coupling between the coplanar waveguide and rectangular waveguide. In particular, the side lobe 214 is substantially reduced, which improves detection accuracy. By using elliptical shaped side slots 176 with the antenna array 170 backed by the waveguide 108, a hybrid transmission mode is delivered that is a combination of quasi-TEM mode from the coplanar waveguide 106 and TE mode from the waveguide 108. The hybrid mode improves SLL at higher frequency edge, thereby increasing bandwidth.

According to the embodiments described herein, antenna configurations operating at a 228-240 GHz frequency range are provided for applications including radar imaging. The antenna system uses coplanar waveguide fed slot radiators and a rectangular waveguide radiator in a hybrid arrangement. This architecture provides desirable performance characteristics and simplifies fabrication and assembly. The embodiments may be used to cover multiple areas, such as around the perimeter of a vehicle. The wave feed transition connects relatively directly to transmit and receive elements. The design of the radiating elements with elliptical shaped slots has been found to result in unexpectedly strong radiation pattern and SLL reduction.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An antenna system, comprising:

a first substrate;

a slot array defined by a conductive layer disposed on the first substrate with a coplanar waveguide joining a number of side slots arranged in a line forming the slot array;

a second substrate spaced apart from the first substrate;

a ground plane defined on the second substrate; and a defined volume waveguide disposed between the first substrate and the second substrate, wherein the coplanar waveguide extends along the first substrate parallel to the defined volume waveguide with the slot array and the defined volume waveguide each substantially filling areas around the first substrate that are substantially common in size, wherein the system is configured to radiate a radiation pattern in a hybrid mode from a combination of both the slot array and the defined volume waveguide.

2. The system of claim 1, comprising a number of conducting pillars grounding the conductive layer to the ground plane and, along with the conductive layer and the ground plane, defining the defined volume waveguide.

3. The system of claim 2, wherein the defined volume waveguide is rectangular in shape.

4. The system of claim 1, wherein each of the number of side slots is elliptical in shape.

5. The system of claim 4, wherein the elliptical shape of the side slots is elongated in a direction perpendicular to the coplanar waveguide.

6. The system of claim 1, comprising a signal coupling between the coplanar waveguide and the defined volume waveguide.

7. The system of claim 1, wherein the coplanar waveguide is configured for a quasi-transverse electromagnetic (quasi-TEM) mode and the defined volume waveguide is configured for a transverse electric (TE) mode, and the radiation pattern results from the hybrid mode as a combination of the quasi-TEM mode and the TE mode.

8. The system of claim 1, comprising a transceiver module disposed between the first substrate and the second substrate, the transceiver module coupled with the coplanar waveguide and with the defined volume waveguide.

9. The system of claim 8, wherein the second substrate comprises a radio frequency printed circuit board, wherein the ground plane is disposed on the radio frequency printed circuit board.

10. The system of claim 9, comprising a radar processing module disposed on the radio frequency printed circuit board, the radar processing module coupled with the coplanar waveguide and with the defined volume waveguide through the transceiver module.

11. An antenna system, comprising:

a first substrate;

a slot array defined by a conductive layer disposed on the first substrate, the conductive layer defining a coplanar waveguide joining a number of side slots arranged in a line forming the slot array, the side slots spaced from one another and each formed in an elliptical shape;

a second substrate spaced apart from the first substrate;

a ground plane defined on the second substrate; and a defined volume waveguide disposed between the first substrate and the second substrate, wherein the system is configured to radiate a radiation pattern in a hybrid mode that is a combination of the slot array and the defined volume waveguide.

12. The system of claim 11, comprising a number of conducting pillars grounding the conductive layer to the ground plane and, along with the conductive layer and the ground plane, defining the defined volume waveguide.

13. The system of claim 11, wherein the elliptical shape of the side slots is elongated in a direction perpendicular to the coplanar waveguide.

14. The system of claim 13, comprising a transition between each side slot and the coplanar waveguide, wherein the transition is disposed adjacent an end of the elliptical shape.

15. The system of claim 11, comprising a signal coupling between the coplanar waveguide and the defined volume waveguide.

16. The system of claim 11, wherein the coplanar waveguide is configured for a quasi-transverse electromagnetic (quasi-TEM) mode and the defined volume waveguide is configured for a transverse electric (TE) mode, and the radiation pattern results from the hybrid mode as a combination of the quasi-TEM mode and the TE mode.

17. The system of claim 11, comprising a transceiver module disposed between the first substrate and the second substrate, the transceiver module coupled with the coplanar waveguide and with the defined volume waveguide.

18. The system of claim 17, wherein the second substrate comprises a radio frequency printed circuit board, wherein the ground plane is disposed on the radio frequency printed circuit board.

19. The system of claim 18, comprising a radar processing module disposed on the radio frequency printed circuit board, the radar processing module coupled with the coplanar waveguide and with the defined volume waveguide through the transceiver module.

20. An antenna system, comprising:

a first substrate comprising a dielectric material;

a conductive layer on the first substrate defines a feed slot joining a number of side slots arranged in a line forming an antenna array in the conductive layer, the side slots spaced from one another and the antenna array disposed on the first substrate, the side slots elliptical in shape;

a coplanar waveguide configured to launch a signal to the antenna array;

a second substrate comprising a radio frequency printed circuit board, the second substrate spaced away from the first substrate;

a ground plane disposed on the second substrate; and a number of conducting pillars grounding the conductive layer to the ground plane, wherein the conductive layer, the ground plane, and the conducting pillars delimit a defined volume waveguide, wherein the system is configured to generate a radiation pattern of electromagnetic energy from the antenna array and the defined volume waveguide, wherein the coplanar waveguide is configured for a quasi-transverse electromagnetic (quasi-TEM) mode and the defined volume waveguide is configured for a transverse electric (TE) mode and the radiation pattern results in a hybrid mode as a combination of the quasi-TEM mode and the TE mode.

* * * * *